Oct. 25, 1966 S. P. DOUGHTY, JR., ETAL 3,281,166
BUCKLING COLUMN SPRING DEVICE
Filed March 2, 1965

Samuel P. Doughty, Jr.
Ettore F. Infante
INVENTORS

BY *Clarence A. O'Brien*
and *Harvey B. Jacobson*
Attorneys

United States Patent Office 3,281,166
Patented Oct. 25, 1966

3,281,166
BUCKLING COLUMN SPRING DEVICE
Samuel P. Doughty, Jr., Austin, Tex. (417 Coral Place, Corpus Christi, Tex.) and Ettore F. Infante, 208 Waterman St., Providence, R.I.
Filed Mar. 2, 1965, Ser. No. 436,542
5 Claims. (Cl. 285—114)

This invention relates to shock absorbers or vibration attenuation devices.

An important object of the present invention is to provide a vibration controlling device through which a substantial reduction in displacing force is effected in connection with various installations where there is a vibration problem including for example, automotive suspension systems, shock absorbing connections for drill strings and anti-vibration instrument mountings.

A unique feature of the present invention, resides in the discovery that buckling of structural columns heretofore regarded as a failure mode, may be utilized to advantage in connection with the purposes of the present invention. In this regard, it is well known that a column element when subjected to an axial compressive load, beyond a critical value, will undergo an abrupt change in mode of deformation because of the buckling phenomenon. Accordingly, an essential ingredient of the present invention resides in the installation of spring column elements arranged to be axially loaded under static or equilibrium conditions by a load which exceeds the aforementioned critical value. The spring column elements associated with the present invention will therefore be elastically deformed by displacing forces while the column elements are restricted by their installation to the buckling mode of operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
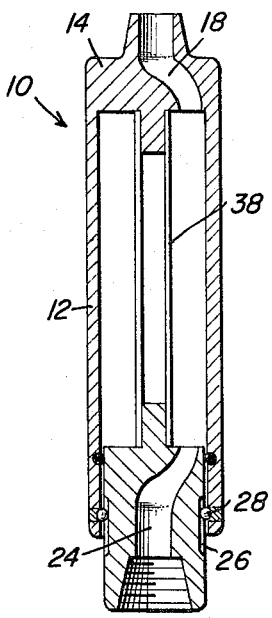
FIGURE 1 is a longitudinal sectional view of a drill pipe shock absorbing connection prior to installation, which is constructed in accordance with the principles of the present invention.
Figure 2:
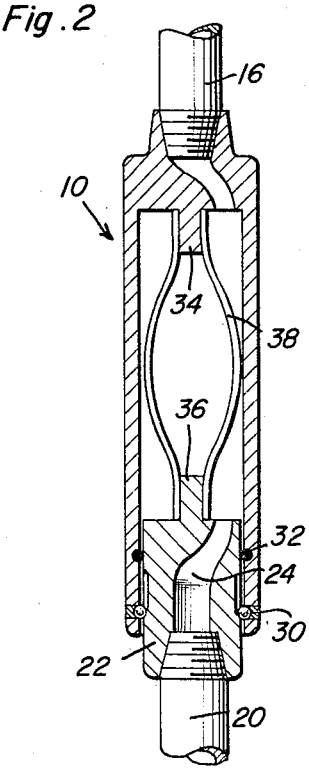
FIGURE 2 is a longitudinal sectional view of the drill pipe shock absorbing connection with installed.

Referring now to the drawings in detail, it will become apparent that the principles of the present invention are applicable to many different types of installations including by way of example only, the drill pipe shock absorbing connector illustrated in FIGURES 1 and 2 and generally referred to by reference numeral 10. The connector 10 includes an axially elongated enclosure 12 formed at one axial end with a connecting portion 14 by means of which the connector is rigidly connected to the end of one conduit 16. Fluid communication is established between the conduit 16 and the enclosure 12 through a fluid passage 18 formed in the connecting portion 14. The conduit 16 is thereby axially aligned with the conduit 20 which is rigidly secured to an axially displaceable member 22 slidably mounted by the enclosure 12. Fluid communication between the conduit 20 and the enclosure 12 is therefore also established by a fluid passage 24 formed in the displaceable member 22.

The displaceable member is formed with longitudinal grooves 26 within which the ball splines 28 are received so as to accommodate slidable movement of the displaceable member 22 yet transmit torque between the conduits 16 and 20 for drilling purposes. The ball splines are therefore seated within circumferentially spaced plugs 30 adjacent the axial end of the enclosure 12 through which the displaceable member 22 extends. The enclosure is maintained fluid tight by an annular seal element 32 seated in an internal groove formed within the enclosure 12 axially spaced from the ball spline elements 28 and wipingly engaging the displaceable member 22.

The connecting end portion 14 and the displaceable member 22 are respectively provided with axially aligned mounting projections 36 and 34 so as to define an axis of symmetry about which a plurality of spring column elements 38 are symmetrically disposed. Although two of such column elements are illustrated in FIGURES 1 and 2, it will be appreciated that any number of such column elements may be utilized as long as they are symmetrically arranged with respect to the aforementioned axis of symmetry which in the case of FIGURES 1 and 2, represents the longitudinal axis common to both the conduit 16 and 20. Prior to installation, without any load being imposed on the column elements 38 as shown in FIGURE 1, the column elements will be straight. When installed, however, and subjected to a predetermined static load, the column elements 38 will assume a buckled configuration as illustrated in FIGURE 2. Accordingly, the column elements 38 are selected as to number and compressive strength in order to insure that the shock absorbing function of the column elements will be confined to the deflection characteristics thereof under the column buckling mode.

Figure 3:
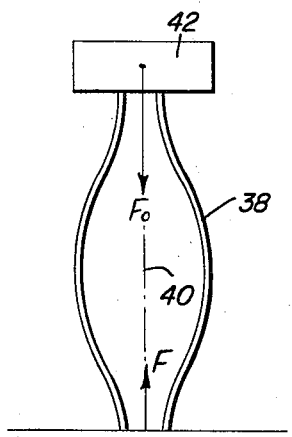
FIGURE 3 is a simplified diagrammatic illustration of a vibration attenuator utilizing the principles of the present invention.
Figure 4:
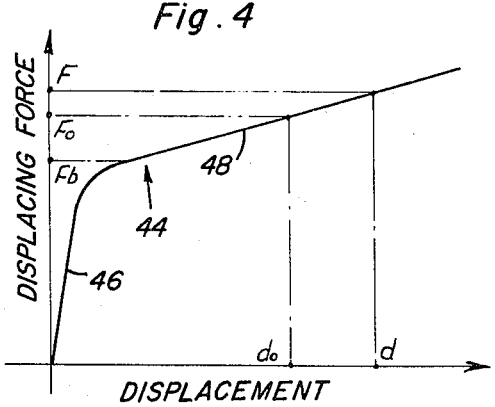
FIGURE 4 is a graphical illustration associated with the operation of the vibration attenuator.

Referring now to FIGURES 3 and 4, the operational principles associated with the present invention may be further explained. As diagrammatically shown in FIGURE 3, the pair of column elements 38 are maintained in a buckled configuration under equilibrium conditions in which a static compressive load is established by external forces $F_o$ applied at the opposite axial ends to the column elements along the axis of symmetry 40. This initial, constant load may be established by the pressure exerted on the drill string in connection with the installation illustrated in FIGURE 2 or the constant initial load may be established by the weight of a vehicle in the case of an automotive suspension system. FIGURE 3 accordingly shows a mass 42 having a weight equal to $F_o$ maintaining the constant load on the column elements 38 under equilibrium conditions. As shown in FIGURE 4, the column elements have a characteristic deflection curve 44 including the portion 46 having a relatively high slope or spring rate corresponding to deformation of the column elements under axial load prior to buckling and a portion 48 having a relatively low slope or spring rate corresponding to deformation in the buckled mode as a softening spring. When, however, the axial compressive load approaches a critical value $F_b$ a large change in the slope of curve 44 occurs when passing through the region between portions 46 and 48 of the curve. Any increased loading imposed on the column members beyond $F_b$ will then produce deformation in accordance with the column buckling portion 48 of the deflection curve 44. The force-deflection relation of the buckling column spring as depicted in FIGURE 4, may therefore characterize the spring 38 as a softening spring since as displacement thereof increases, the slope of the deflection curve decreases. Further, the buckling column spring would be classified as non-linear because the force deflection curve 44 is not a straight line. In this regard most mechanical springs are operationally limited to a straight line force-deflection relation. Thus, to support a relatively large load, the usual soft linear spring suspension would require a relatively large displacement as compared to the smaller displacement associated with the same average load supported by the buckling column springs 38. Therefore, the average supported load will be less restricted in magnitude when utilizing a spring suspension in accordance with the present invention.

Accordingly, the initial constant load $F_o$ maintained on the column elements, is designed to exceed the critical value $F_b$ in order to restrict the column members to the column buckling mode of the deflection curve. It will also be observed from FIGURE 4, that along the portion 48 of the deflection curve corresponding to the column buckling mode, for relatively large deformation from $d_o$ to $d$, the change in force from $F_o$ to $F$ is small compared to the load $F_o$. Thus, as compared to the constant initial load $F_o$, any change in loading due to vibration will be relatively small as compared to deflection of the column members so that higher loads may be supported. It will therefore be apparent that the foregoing attribute of the buckling column elements would not arise if the column elements perform their functions within the portion 46 of their deflection curves. Accordingly, it is essential that the number of column elements be selected and their compressive strength be such that the constant equilibrium loading will exceed the critical load value at which buckling occurs.

From the foregoing description, the construction and operation of the vibration attenuating device of the present invention will be apparent. It will therefore be appreciated, that the system of the present invention may be applicable to many installations and would in the case of an automotive suspension system produce a very soft ride since the lower end of the spring elements may undergo relatively large displacements resulting in only small changes in force imposed on the mass of the vehicle represented for example by the mass 42 in FIGURE 3. Dependent upon the number of column elements to be utilized they may be arranged about an axis of symmetry forming the corners of a regular polygon. Also, in addition to the aforementioned automotive suspension system installation, it will be apparent that the vibration attenuator may be utilized in connection with the shock absorbing connection described in order to reduce drill string vibration in oil rigs. The principles of the present invention will also be applicable to many problems of anti-vibration instrument mounting.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vibration attenuator device comprising, a plurality of column elements subject to buckling by an axial load in excess of a critical value, means symmetrically mounting said column elements about an axis of symmetry for axial loading of said column elements, said column elements being straight and parallel to said axis in the unloaded condition thereof and means operative through said mounting means for maintaining a constant load on said column elements in excess of said critical value under equilibrium conditions, whereby displacing force transmitted through the column elements is substantially reduced in relation to said constant load.

2. In a shock absorbing spring device, a plurality of column elements symmetrically disposed about an axis of symmetry, said column elements being straight in an unstressed state and having a force-deflection characteristic that sharply changes in slope when axially loaded beyond a predetermined compressive load, displaceable means connected to said column elements, and means for maintaining an average load on said column elements exceeding said predetermined compressive load to hold the column elements in a buckled condition.

3. A shock absorbing connection between a pair of conduits axially aligned relative to a common axis comprising, a fluid enclosure, means rigidly connecting said enclosure with one of said conduits and establishing fluid communication therewith, displaceable means rigidly connected to the other of said conduits and having a fluid passage in fluid communication with said other of the conduits, means slidably mounting the displaceable means within the enclosure for displacement relative thereto to a position under a predetermined static load, a plurality of column elements disposed within said enclosure for resisting displacement of said displaceable means from said position, said column elements being buckled from a straight condition by an axial compressive load below said predetermined static load and means mounting said column elements in the straight condition between said displaceable means and the connecting means in symmetrical relation to said common axis for axial loading of the column elements.

4. A vibration attenuating device, adapted to be loaded by a predetermined average force comprising, a plurality of column elements elastically deformable from a straight to a buckled condition each column element having a non-linear force-deflection characteristic represented by a curve which sharply reduces in slope when the column element is axially loaded by an increasing force approaching a predetermined critical value, and means interconnecting said column elements for simultaneous axial loading thereof in a buckled condition by forces exceeding said predetermined critical value to reduce the change in loading of the device relative to said average force.

5. A spring suspension device adapted to support a predetermined static load comprising, a plurality of elastically deformable column elements, each column element having a non-linear force-deflection characteristic represented by a curve which substantially decreases in slope as the column element deformation is increased beyond a critical amount, and means interconnecting each of said column elements with said static load for axial loading thereof causing deformation beyond said critical amount.

References Cited by the Examiner

UNITED STATES PATENTS

| | | | |
|---|---|---|---|
| 2,113,651 | 4/1938 | Heaston | 64—23 X |
| 2,716,011 | 8/1955 | Steimen | 248—358.1 X |
| 2,756,022 | 7/1956 | Sturgeon | 285—302 X |
| 3,007,660 | 11/1961 | Rosan | 248—20 |

LAVERNE D. GEIGER, *Primary Examiner.*

T. MOORHEAD, *Assistant Examiner.*